United States Patent [19]

Inouye

[11] 4,239,124
[45] Dec. 16, 1980

[54] FLUID-TIGHT CLOSURE APPARATUS

[75] Inventor: Hiroshi Inouye, Minorimachi, Japan

[73] Assignee: Hitachi, Ltd., Japan

[21] Appl. No.: 952,990

[22] Filed: Oct. 20, 1978

[30] Foreign Application Priority Data

Oct. 28, 1977 [JP] Japan .................................. 52/128686

[51] Int. Cl.³ ....................... B65D 53/04; B65D 39/08
[52] U.S. Cl. ..................................... 220/240; 220/328; 277/190
[58] Field of Search ...................... 220/240, 3; 277/117, 277/190, 191, DIG. 2, DIG. 6

[56] References Cited

U.S. PATENT DOCUMENTS

| | | | |
|---|---|---|---|
| 2,459,721 | 1/1949 | Poltorak | 277/DIG. 6 |
| 3,379,332 | 4/1968 | Anderson | 220/240 |
| 3,430,801 | 3/1969 | Homrig | 220/240 |
| 3,702,193 | 11/1972 | Flegel et al. | 277/DIG. 2 |

*Primary Examiner*—Robert I. Smith
*Attorney, Agent, or Firm*—Craig & Antonelli

[57] ABSTRACT

A fluid-tight closure apparatus for providing a fluid-tight seal between the inner peripheral surface of the cylindrical bore in an enclosure receiving therein a high-pressure fluid and the outer peripheral surface of an end closure wall held in the cylindrical bore. The apparatus has a pressurizing ring fitted around the outer peripheral surface at the inner end portion of the end closure wall for a small axial displacement. The pressurizing ring is adapted to derive the required sealing pressure from the internal fluid pressure in the enclosure. The apparatus further has a seal ring disposed between the pressurizing ring and the inner peripheral surface of the cylindrical bore and/or between the pressurizing ring and the end closure wall, and a bolt screwed through the end wall member into the pressurizing ring for imparing an initial sealing surface pressure to sealing areas, through the axial displacement of the pressurizing ring toward the end closure wall.

16 Claims, 9 Drawing Figures

FLUID-TIGHT CLOSURE APPARATUS

BACKGROUND OF THE INVENTION

1. Field of the Invention

The present invention relates to a fluid-tight closure apparatus and, more particularly, to an apparatus for providing a fluid-tight seal between the inner surface of a cylindrical bore in an enclosure receiving a high-pressure fluid, such as the casing of a turbo machine or other cylindrical pressure vessel, and the outer peripheral surface of an end closure wall which is held in the cylindrical bore.

2. Description of the Prior Art

In enclosures having a high internal pressure, particularly casings of turbo machines handling high-pressure fluids, a closure apparatus is used in which an end closure wall for closing the opening end of the casing can be easily attached to and detached from the casing. The closure apparatus for this purpose is usually provided with a fixing or stop member, for example, such as shearing key by means of which the end closure wall is fixed in the end opening of the cylindrical bore in the enclosure, against the axial movement of the end closure wall which might, for otherwise, be caused by the internal pressure in the enclosure.

This type of closure apparatus is disclosed, for example, in British Pat. No. 1,396,457 and U.S. Pat. No. 3,874,814. In these closure apparatus, the outer peripheral surface of the end closure wall and the inner peripheral surface of the cylindrical bore in the enclosure in combination constitute the sealing surfaces against the leakage of the fluid. Usually, "O" rings or the like elastic sealing members are used as the sealing means interposed between the sealing surfaces. These sealing members such as "O" rings are, however, not durable enough especially when the temperature and the pressure of the fluid in the enclosure are high.

Under this circumstance, it has been proposed and attempted to use sealing means including a metallic gasket packing. In this sealing means, the outer peripheral surface of the end closure wall is partially tapered so that the metallic gasket packing interposed between the tapered surface of the end closure wall and the inner peripheral surface of the cylindrical bore may be expanded radially outwardly into tight contact with the latter, by the axial displacement of the end closure wall due to the internal fluid pressure.

This sealing means including the metallic gasket packing, is capable of improving the sealing performance, on the other hand poses a new problem that a large stress exceeding the yielding point is caused in the metallic gasket packing, due to the radial force imparted to the latter by the tapered surface of the end closure wall due to the pressure in the enclosure. Once the metallic gasket packing is collapsed, it can no longer be used, and a troublesome disassembling work is required for the removal of the collapsed packing.

SUMMARY OF THE INVENTION

It is therefore an object of the invention to provide a fluid-tight closure apparatus capable of forming a fluid-tight seal against the leakage of fluid, between the inner peripheral surface of the cylindrical bore in an enclosure receiving therein a high-pressure fluid and the outer peripheral surface of an end closure wall held in the cylindrical bore.

It is another object of the invention to provide a fluid-tight closure apparatus which can be used even after it has been subjected to fluctuating pressure and temperature of the fluid in the enclosure.

It is a still another object of the invention to provide a fluid-tight closure apparatus which is easy to disassemble and assemble.

To these ends, according to the invention, there is provided a fluid-tight closure apparatus for providing a fluid-tight seal between the inner peripheral surface of a cylindrical bore in an enclosure receiving therein a high-pressure fluid and the outer peripheral surface of an end closure wall held in the cylindrical bore, comprising: a pressurizing ring mounted around the outer peripheral surface at the inner end portion of the end closure wall for a small axial displacement, the pressurizing ring having a pressure receiving surface of an area large enough to derive a required sealing pressure from the internal fluid pressure to which the pressure-receiving surface is subjected, and an outer conical surface adapted to produce, when the pressurizing ring is moved axially by the internal fluid pressure, a radial force acting as the sealing pressure, and an inner conical surface; a seal ring disposed between the outer conical surface of the pressurizing ring and the inner peripheral surface of the cylindrical bore: and means for imparting an initial sealing surface pressure, through the axial displacement of the pressurizing ring toward the end closure wall to sealing areas between the pressurizing ring and the seal ring, between the inner peripheral surface of the cylindrical bore and the seal ring, and between the end closure wall and the pressurizing ring.

These and other objects and advantageous features of the invention will become clear from the following description of the preferred embodiments taken in conjunction with the accompanying drawings.

DESCRIPTION OF THE PREFERRED EMBODIMENTS

Figure 1:
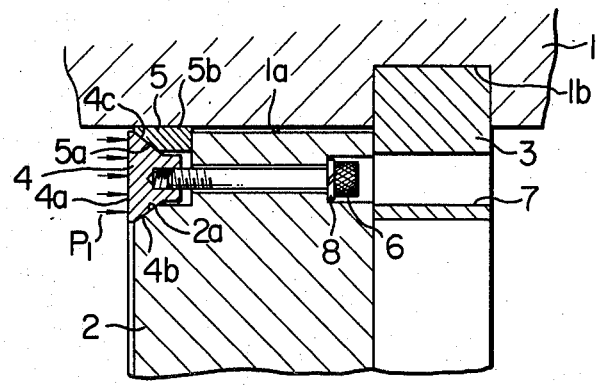
FIG. 1 is a sectional view of a fluid-tight closure apparatus in accordance with the invention.

Referring first to FIG. 1 showing a fluid-tight closure apparatus which is an embodiment of the invention, a reference numeral 1 denotes an enclosure receiving therein a fluid of high temperature and pressure, while an end closure wall inserted into an end opening of the cylindrical bore 1a in the enclosure 1 is designated at a numeral 2. In the inner peripheral surface of the cylindrical bore 1a in the enclosure 1, formed is an annular groove 1b for receiving a fixing or stop member, for example, such as a split-type shearing key 3. This shearing key 3 prevents the end closure wall 2 from being moved in the axial direction of the enclosure 1 by the pressure of the fluid in the latter.

The portion of the outer peripheral surface of the end closure wall 2 closer to the pressure-receiving surface of the same has a conical surface 2a which diverges toward the end of the end closure wall 2 opposite to the above-mentioned pressure-receiving surface. A pressurizing ring 4 is fitted around the conical surface 2a of the end closure wall 2. This pressurizing ring 4 has an annular pressure-receiving surface 4a by means of which a sealing surface pressure is derived from the fluid pressure in the enclosure 1, an inner conical surface 4b the diameter of which increases toward the end opposite to the pressure-receiving surface 4a and an outer conical surface 4c the diameter of which decreases toward the same end. The inner conical surface 4b of the pressurizing ring 4 is adapted to contact the conical surface 2a of the end closure wall 2, so that these conical surfaces constitute a sealing area in cooperation with each other. A seal ring 5 which may be a metallic gasket packing is interposed between the inner peripheral surface of the cylindrical bore 1a in the enclosure 1 and the outer conical surface 4c of the pressurizing ring. The seal ring 5 has an inner tapered surface 5a which contacts the outer conical surface 4c so as to constitute, in cooperation with the latter, another sealing area. The outer conical surface 4c of the pressurizing ring 4 functions to give a radial component perpendicular to the axis by the wedging action due to the force of the fluid pressure $P_1$ acting on the pressure-receiving surface 4a. The outer peripheral surface 5b of the seal ring 5 is adapted to be expanded radially outwardly, due to the radial component of the force, into a tight contact with the inner peripheral surface of the cylindrical bore 1a in the enclosure 1 so that these surfaces in cooperation constitute still another sealing area.

In order to impart an initial sealing surface pressure to these three sealing areas, an initial tightening bolt 6 is screwed into the end surface of the pressurizing ring 4 opposite to the pressure-receiving surface 4a, through the end closure wall 2. As the initial tightening bolt 6 is driven deeper into the pressurizing ring 4, the latter is biased toward the end closure wall 2, so that the aforementiond three sealing areas are applied with the necessary initial sealing pressure. A bore 7 is formed through the shearing key 3, so as to make the bolt 6 accessible for the adjusting purpose.

The fluid-tight closure apparatus of this embodiment can be assembled and disassembled in the following manner.

At first, the pressurizing ring 4 and the seal ring 5 are secured to the end closure wall 2 by means of the initial tightening bolt 6, before they are inserted into the cylindrical bore 1a in the enclosure 1. In this step, in order to facilitate the insertion into the cylindrical bore 1a, the outer diameter of the seal ring 5 is maintained substantially equal to or smaller than that of the end closure wall 2. Then, after inserting the end closure wall 2 into the predetermined position in the cylindrical bore 1a together with the pressurizing ring 4 and the seal ring 5, the shearing key is fitted into the groove 1b in the inner surface of the cylindrical bore 1a. Subsequently, the initial tightening bolt 6 is tightened by a suitable jig inserted through the bore 7 in the end closure wall 2, so that the pressurizing ring 4 is moved axially toward the end closure wall 2 to spread or expand the seal ring 5. Consequently, the sealing areas are adequately preloaded with the initial sealing surface pressure, thus completing the assembling. In operation, a part of the internal fluid pressure acting on the pressure-receiving surface 4a of the pressurizing ring 4 is converted into the necessary sealing surface pressures for the pressurizing ring 4 and the seal ring 5 disposed between the inner peripheral wall of the cylindrical bore 1a and the end closure member 2.

Consequently, a sufficient sealing effect is attained without being affected by the magnitude of the fluid pressure in the enclosure 1 and the fluctuation of the same. For disassembling the closure apparatus, the steps of the assembling process are taken in the reverse order.

In the illustrated embodiment as shown in FIG. 1, there is a fear that the bolt 6 may be loosened due to the difference in thermal expansion coefficient between the end closure wall 2 and the bolt 6, especially when the temperature and the pressure of the fluid in the enclosure 1 are high. To avoid such a loosening of the bolt 6, the end closure wall 2 is usually made to have a larger coefficient of thermal expansion than the bolt 6. This way of solution, however, is often insufficient. It is therefore recommended to place a washer 8 made of a material having a larger coefficient of thermal expansion than the end closure wall 2, beneath the head of the bolt 6.

Figure 2:
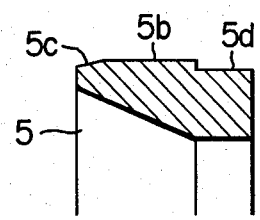
FIG. 2 is a sectional view of another example of the seal ring incorporated in the closure apparatus of the invention.

FIG. 2 shows another example of the seal ring as incorporated in the closure apparatus of the invention. In this seal ring 5, the end portion of the outer peripheral surface closer to the pressure-receiving surface is tapered as at 5c. Also, a stepped annular notch 5d is formed in the end portion of the outer peripheral surface opposite to the pressure-receiving surface. In place of the notch 5d, the end portion of the outer peripheral surface opposite to the pressure-receiving surface may be tapered so that the end surface opposite to the pressure-receiving surface has a diameter less than that of the outer peripheral surface 5b. This shape of the seal ring 5 considerably facilitates the insertion and withdrawal of the seal ring 5, to and from the cylindrical bore 1a.

Figure 3:
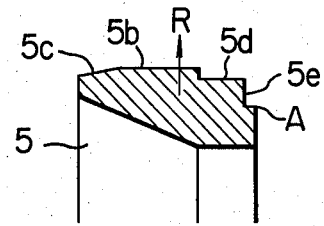
FIG. 3 is a sectional view of still another example of the seal ring.

FIG. 3 shows still another example of the seal ring as incorporated in the closure apparatus of the invention. In this example, the area on the seal ring 5 at which the latter contacts the end closure wall 2 is made smaller by an annular step 5e in the end portion of the peripheral surface of the seal ring 5 closer to the end closure wall 2.

Following advantages are offered by this shape of end surface of the seal ring 5 closer to the end closure wall 2. In operation, the axial force required for the sealing, exerted by the internal fluid pressure which is received by the pressurizing ring 4, is applied to the end surface of the seal ring 5 where it contacts the end closure wall 2. By arranging such that the pressure of this contact falls around the yielding point of the seal ring 5, the axial length of the seal ring 5 is shortened by this contact pressure, so that the inner peripheral wall of the cylindrical bore 1a, end closure wall 2, pressurizing ring 4 and the seal ring 5 are optimumly positioned in relation to one another, so as to ensure the good sealing effect at the three sealing areas presented by these members.

Further, a closer contact of the outer peripheral surface 5b of the seal ring 5 with the inner surface of the cylindrical bore 1a is obtained, because such a moment is caused by the radial force R exerted by the pressurizing ring 4 on the seal ring 5 as to rotate the latter around a back portion A of the step 5e.

Figure 4:
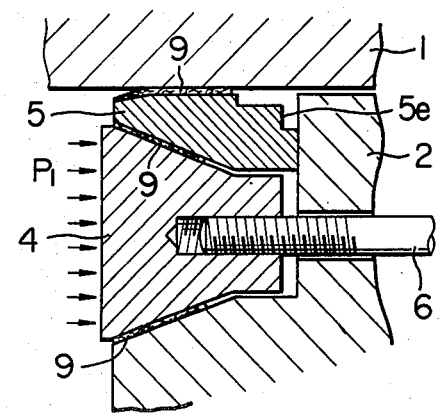
FIG. 4 is a sectional view of a modification of the closure apparatus as shown in FIG. 1, in which sealing layers are disposed on the sealng surfaces.

FIG. 4 shows a modification of the closure apparatus as shown in FIG. 1, in which a sealing layer is interposed between the two surfaces defining each sealing area. This sealing layer is preferably made of a heat and pressure resisting material, for example, such as an expanded graphite sheet 9 or a sheet of fluorine-contained polymers.

Experiments showed that the pressing force required at each sealing area can be remarkably reduced to ⅓, by placing the graphite sheet 9 between the sealing surfaces. At the same time, it has been confirmed that a contact pressure, which is about 2 times as large that of the internal fluid pressure $P_1$ is required at each sealing area.

By making use of the expanded graphite sheet, it becomes possible to reduce the force by which the sealing surfaces are pressed to each other in each sealing area, so that the sizes of the pressurizing ring 4, seal ring 5 and the bolt 6 are all diminished. In addition, the seal ring 5 can be repeatedly used because the sufficient sealing effect is achieved without causing any large stress exceeding the maximum allowable stress in each member.

Figure 5:
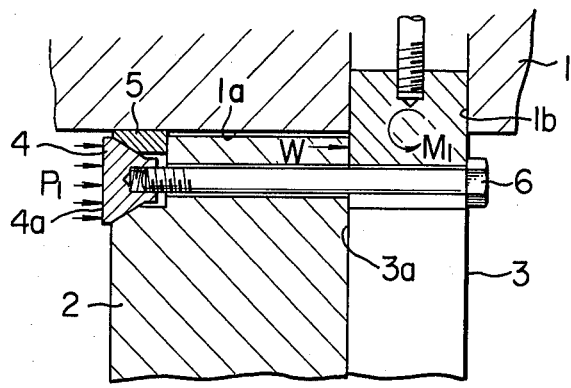
FIG. 5 is an illustration of another example of an initial tightening bolt as incorporated in the closure apparatus of the invention.

FIG. 5 shows another example of the initial tightening bolt 6 as used in the closure apparatus of the invention. This bolt 6 is adapted to be screwed into the pressurizing ring 4, through a U-shaped axial groove formed in the inner peripheral surface of the shearing key 3 and then through an axial through bore formed in the end closure wall 2, while the head of the bolt is pressed against the end surface of the shearing key 3 opposite to the end closure wall 2. When this type of bolt 6 is used, the split-type shearing key 3 can conveniently be retracted into the wall of the cylindrical bore 1a, by suitable bolt means, so as to permit the assembling and disassembling of the closure apparatus.

It is possible to suppress the play of the pressurizing ring 4, shearing key 3 and the end closure wall 2, by tightening them together in the described manner. The whole part of the force W exerted by the internal fluid pressure $P_1$ acting on the inner surface of the end closure wall 2 and on the pressure-receiving surface 4a of the pressurizing ring 4 is applied to the surface 3a of the shearing key closer to the end closure wall. Consequently, the shearing key 3 is pressed by the wall of the groove 1b in the cylindrical bore 1a opposite to the end closure wall so as to be offset. At the same time, a moment $M_1$ is caused to act in the direction of arrow. This moment is born by the bolt 6. Therefore, the initial tightening force exerted by the bolt 6 is imparted to each sealing area, so as to further increase the contacting pressure, thereby to greatly improve the sealing performance at each sealing area.

Figure 6:
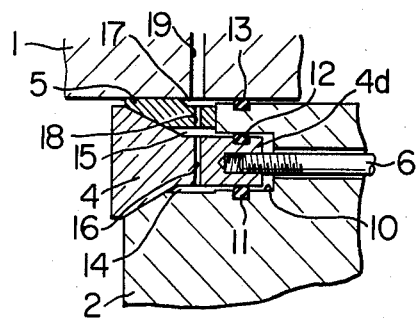
FIG. 6 shows another modification in which secondary seal is provided.
Figure 7:
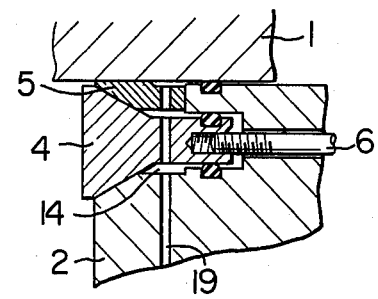
FIG. 7 is a sectional view of another example of the closure apparatus having a secondary seal.

FIG. 6 shows a modification of the closure apparatus in which a secondary seal is provided. The pressurizing ring 4 is provided with an annular projection 4d which projects axially outwardly from the end thereof closer to the bolt 6. At the same time, an annular groove 10 for receiving the annular projection 4d is formed in the portion of the end closure wall 2 confronting the annular projection 4d. Secondary seals 11-13 having a good elasticity, e.g. "O" rings or the like, are inserted between the contacting surfaces of the annular projection 4d and groove 10 and betwen the contacting area between the outer peripheral surface of the end closure wall 2 and the inner peripheral surface of the cylindrical bore 1a. In addition, a communication bore 16 is formed in the pressurizing ring 4, so as to communicate the circumferential gap 14 between the end closure wall 2 and the pressurizing ring 4 and the circumferential gap 15 between the pressurizing ring 4 and the seal ring 5. Further, another communication bore 18 is formed in the seal ring 5, so as to communicate the above-mentioned circumferential gap 15 with the circumferential gap 17 formed between the inner surface of the cylindrical bore 1a and the seal ring 5. In addition, a drain port 19 is formed in the wall of the enclosure 1. The drain port 19 may be formed in the end closure wall 2, so as to communicate the gap 14, as shown in FIG. 7.

Due to the provision of the secondary seals 11-13 and the drain port 19, the fluid is prevented from flowing out of the enclosure 1, even if the internal fluid happens to leak through the aforementioned three sealing areas. In addition, the leaked fluid stored in the gaps can be discharged out of the enclosure 1 through the drain port 19. It is quite advantageous that, when the closure apparatus of the invention is incorporated in a pump, compressor or the like, the leaked fluid can easily be led out without staying in the machine.

Figure 8:
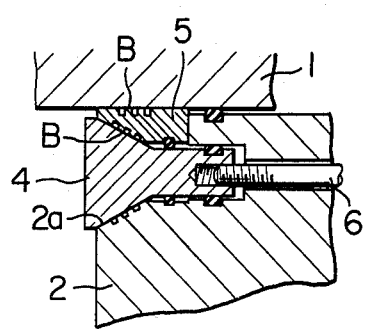
FIG. 8 is a sectional view of a fluid-tight closure apparatus which is another embodiment of the invention.

FIG. 8 shows another embodiment of the invention. In this embodiment, a plurality of axially spaced cirfumferential grooves are formed in the inner and outer surfaces of the seal ring 5 and the conical surface 2a of the end closure wall 2 to define a plurality of axially spaced circumferential sealing restrictions B. By providing a plurality of circumferential sealing restrictions B, it is possible to uniformalize the sealing area. In addition, since the plurality of sealing restrictions B are spaced in the axial direction, an improved sealing effect can be obtained, because the fluid leaking out through the innermost sealing restriction B is conveniently checked by the subsequent restriction B.

Figure 9:
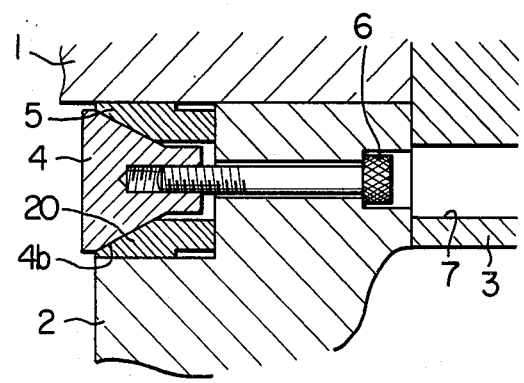
FIG. 9 is a sectional view of a fluid-tight closure apparatus which is still another embodiment of the invention.

FIG. 9 shows another embodiment of the invention, in which a second sealing ring 20 having the same function as the aforementioned seal ring 5 is interposed between the inner conical surface 4b of the pressurizing ring 4 and the end closure wall 2.

This second seal ring 20 conveniently plays the role of a guide for the smoother axial movement of the pressurizing ring 4 caused by the internal fluid pressure or by the bolt 6. In addition, the radial displacement of the pressurizing ring 4 is prevented by the conical surfaces of the seal rings 5, 20 when it is moved axially, so that the bolt 6 is prevented from being contacted by the wall of the bore through which it is extended.

It will be clear to those skilled in the art that the modifications as shown in FIG. 2 to 8 can be directly applied also to the embodiment as shown in FIG. 9.

As has been described, according to the invention, the pressing force required for the sealing is derived from the internal fluid pressure in the enclosure by making use of a pressurizing ring and a sealing ring having conical surfaces, and is shared by respective sealing areas. Consequentiy, the application of excessively large force to the seal ring is avoided to afford the repeated use of the latter.

In addition, since the sealing part is made together with the end closure wall by means of the initial tightening bolt, the insertion and withdrawal of these members into and out of the enclosure is much facilitated to remarkably improve the efficiency of the assembling and disassembling of the closure apparatus.

What is claimed is:

1. A flight-tight closure apparatus for providing a fluid-tight seal between an inner peripheral surface of a cylindrical bore in an enclosure receiving therein a high-pressure fluid and an outer peripheral surface of an end closure wall held in said cylindrical bore, comprising:

said end closure wall including a pressure-receiving surface receiving the internal fluid pressure of the high-pressure fluid within said enclosure and a conical surface of the outer peripheral surface of said end closure wall adjacent to said pressure-receiving surface thereof, said conical surface converging toward said pressure-receiving surface;

a pressurizing ring fitted around the outer peripheral surface of said end closure wall adjacent to said pressure-receiving surface thereof for a small axial displacement, said pressurizing ring including a pressure-receiving surface in direct contact with the high-pressure fluid within said enclosure so as to be subjected to the internal fluid pressure and having an area large enough to derive a required sealing pressure from the internal fluid pressure, and outer and inner conical surfaces for producing, when said pressurizing ring is moved axially by said internal fluid pressure, a radial force acting as the sealing pressure, said inner conical surface of said pressurizing ring cooperating with said conical surface on said end closure wall to define a sealing area therebetween;

a seal ring disposed between said outer conical surface of said pressurizing ring and said inner peripheral surface of said cylindrical bore with sealing areas defined between said seal ring and said outer conical surface of said pressurizing ring and between said seal ring and said inner peripheral surface of said cylindrical bore, respectively; and means for imparting an initial sealing surface pressure, through the axial displacement of said pressurizing ring toward said end closure wall, to said sealing areas between said outer conical surface of said pressurizing ring and said seal ring, between said inner peripheral surface of said cylindrical bore and said seal ring and between said conical surface of said end closure wall and said inner conical surface of said pressurizing ring.

2. A fluid-tight closure apparatus as claimed in claim 1, wherein the surface of said seal ring contacting said inner peripheral surface of said cylindrical bore, another surface of said seal ring contacting said pressurizing ring and the surface of said end closure wall contacting said pressurizing ring are provided with a plurality of axially spaced circumferential grooves.

3. A fluid-tight closure apparatus as claimed in claim 1, wherein said seal ring has an annular notch formed in the end face of said seal ring in contact with said end closure wall, so that the contact pressure on said seal ring is increased to as large as the yielding stress of the material of said seal ring.

4. A fluid-tight closure apparatus as claimed in claim 1, 2, 3 or 16, wherein a heat and pressure resisting sealing layer is disposed in each of said sealing areas between said end closure wall and said pressurizing ring, between said pressurizing ring and said seal ring and between said inner peripheral surface of said cylindrical bore and said seal ring.

5. A fluid-tight closure apparatus as claimed in claim 1, 2 or 3, further comprising an annular projection formed on said pressurizing ring and projecting axially outwardly therefrom, an annular groove for receiving said annular projection and formed in said end closure wall, and secondary seals disposed between the walls of said annular groove and inner and outer peripheral surfaces of said annular projection, and between the inner peripheral wall of said cylindrical bore and said end closure wall, respectively.

6. A fluid-tight closure apparatus as claimed in claim 1, 2 or 3 wherein each of said sealing and pressurizing ring is provided with at least one bore for introducing the fluid leaking through the sealing areas between these rings, between said end closure wall and said pressurizing ring, and between said seal ring and said inner peripheral surface of said cylindrical bore, to a drain port formed in either one of said enclosure and said end closure wall.

7. A fluid-tight closure apparatus for providing a fluid-tight seal between the inner peripheral surface of the cylindrical bore in an enclosure receiving therein a high-pressure fluid and the outer peripheral surface of an end closure wall held in said cylindrical bore, comprising:

a pressurizing ring fitted around the outer peripheral surface at the inner end portion of said end closure wall for a small axial displacement, said pressurizing ring having a pressure-receiving surface of an area large enough to derive a sealing pressure from the internal fluid pressure to which said pressure-receiving surface is subjected, and an outer and inner conical surfaces adapted to produce, when said pressurizing ring is moved axially by said internal fluid pressure, a radial force acting as the sealing pressure;

an outer and an inner seal rings disposed between said outer conical surface of said pressurizing ring and said inner peripheral surface of said cylindrical bore and between said inner conical surface of said pressurizing ring and said end closure wall, respectively; and means for imparting an initial sealing surface pressure, through the axial displacement of said pressurizing ring toward said end closure wall, to a sealing area between said pressurizing ring and said outer seal ring, a sealing area between said pressurizing ring and said inner seal ring, a sealing area between said outer seal ring and said inner peripheral surface of said cylindrical bore and to a sealing area between said inner seal ring and said end closure wall.

8. A fluid-tight closure apparatus as claimed in claim 7, wherein the surfaces of said inner seal ring contacting said inner peripheral surface of said cylindrical bore and said pressurizing ring, and the surfaces of said outer seal ring contacting said pressurizing ring and said end closure wall are provided with a plurality of axially spaced circumferential grooves.

9. A fluid-tight closure apparatus as claimed in claim 7 or 8, wherein each of said outer and inner seal rings has an annular notch formed in its end surface contacting said end closure wall, so that the contact pressure in each seal ring is increased to such a level as to cause the yielding stress of the material of said seal ring.

10. A fluid tight closure apparatus as claimed in claim 7, 8 or 9, wherein heat and pressure resisting sealing layer is disposed in each of said sealing areas between said end closure wall and said inner seal ring, between said inner seal ring and said pressurizing ring, between said pressurizing ring and said outer seal ring and between said outer seal ring and said inner peripheral surface of said cylindrical bore and said outer seal ring.

11. A fluid-tight closure apparatus as claimed in claim 7, 8, 9 or 10, further comprising an annular projection formed on said pressurizing ring and projecting axially outwardly therefrom, an annular groove for receiving said annular projection and formed in said end closure wall, and secondary seals disposed between the walls of said annular groove and the inner and outer peripheral surfaces of said annular projection, and between the inner peripheral surface of said cylindrical bore and said end closure wall, respectively.

12. A fluid-tight closure apparatus as claimed in claim 7, 8, 9, 10 or 11, wherein each of said inner and outer seal rings and said pressurizing ring is provided with at least one bore adapted to introduce the leaked fluid to a drain port formed in any one of said end closure wall and said enclosure, said leaked liquid having been leaked through said sealing areas between said end closure wall and said inner seal ring, between said inner seal ring and said pressurizing ring, between said pressurizing ring and said outer sealing ring and between said outer seal ring and said inner peripheral surface of said cylindrical bore.

13. A fluid-tight closure apparatus as claimed in claim 2, wherein said seal ring has an annular notch formed in the end face of said seal ring in contact with said end closure wall, so that the contact pressure on said seal ring is increased to as large as the yielding stress of the material of said seal ring.

14. A fluid-tight closure apparatus as claimed in claim 4, further comprising an annular projection formed on said pressurizing ring and projecting axially outwardly therefrom, an annular groove for receiving said annular projection and formed in said end closure wall, and secondary seals disposed between the walls of said annular groove and inner and outer peripheral surfaces of said annular projection, and between the inner peripheral wall of said cylindrical bore and said end closure wall, respectively.

15. A fluid-type closure apparatus as claimed in claim 6, wherein each of said sealing and pressurizing ring is provided with at least one bore for introducing the fluid leaking through the sealing areas between these rings, between said end closure wall and said pressurizing ring, and between said seal ring and said inner peripheral surface of said cylindrical bore, to a drain port formed in either one of said enclosure and said end closure wall.

16. A fluid-type closure apparatus according to claim 1, wherein said seal has a plurality of annular steps arranged in a manner that the outer diameter of said seal becomes smaller from step-to-step in the direction of said axial displacement.

* * * * *